United States Patent
Costa et al.

(10) Patent No.: US 11,371,558 B2
(45) Date of Patent: Jun. 28, 2022

(54) ROLLER BEARING RING AND DISMOUNTING PROCEDURE

(71) Applicant: Aktiebolaget SKF, Gothenburg (SE)

(72) Inventors: Patrik Costa, Älvängen (SE); Helena Jacobsson Sandlund, Gothenburg (SE); Arne Lars Jonas Kullin, Landvetter (SE)

(73) Assignee: Aktiebolaget SKF, Gothenburg (SE)

( * ) Notice: Subject to any disclaimer, the term of this patent is extended or adjusted under 35 U.S.C. 154(b) by 0 days.

(21) Appl. No.: 17/097,712

(22) Filed: Nov. 13, 2020

(65) Prior Publication Data
US 2021/0215198 A1 Jul. 15, 2021

(30) Foreign Application Priority Data
Jan. 14, 2020 (DE) .......................... 102020200361.0

(51) Int. Cl.
| | |
|---|---|
| *F16C 23/08* | (2006.01) |
| *F16C 33/58* | (2006.01) |
| *F16C 33/36* | (2006.01) |
| F16C 33/64 | (2006.01) |

(52) U.S. Cl.
CPC .......... *F16C 33/585* (2013.01); *F16C 23/082* (2013.01); *F16C 33/36* (2013.01); *F16C 33/64* (2013.01); *F16C 2226/74* (2013.01); *Y10T 29/49698* (2015.01)

(58) Field of Classification Search
CPC .......... F16C 19/26; F16C 19/36; F16C 23/08; F16C 23/082; F16C 23/084; F16C 23/086; F16C 33/585; F16C 33/605; F16C 33/64; F16C 2226/74; F16C 2237/00; F16C 43/04; Y10T 29/49698
See application file for complete search history.

(56) References Cited

U.S. PATENT DOCUMENTS

| | | | | |
|---|---|---|---|---|
| 6,033,122 | A * | 3/2000 | Kellstrom | F16C 23/08 384/563 |
| 6,132,097 | A * | 10/2000 | Kellstrom | F16C 33/58 384/450 |
| 2005/0058382 | A1* | 3/2005 | Williams | F16C 33/7836 384/568 |
| 2013/0301973 | A1* | 11/2013 | Wendeberg | F16C 19/26 384/551 |
| 2015/0098825 | A1* | 4/2015 | Wendeberg | F16C 33/586 416/174 |

(Continued)

FOREIGN PATENT DOCUMENTS

| | | | | |
|---|---|---|---|---|
| DE | 19749638 | A1 * | 4/1999 | ............. F16C 19/26 |
| FR | 2730020 | A3 * | 8/1996 | ........... F16C 33/7806 |

(Continued)

Primary Examiner — Phillip A Johnson
(74) Attorney, Agent, or Firm — Garcia-Zamor Intellectual Property Law; Ruy Garcia-Zamor; Bryan Peckjian

(57) ABSTRACT

A roller bearing ring having at least one raceway. The raceway provides a first and a second axial end and a diameter of the first axial end and a diameter of the second axial end are either both greater than the mean diameter of the raceway or both less than the mean diameter of the raceway. The roller bearing ring includes a projection, which is on the same side of the bearing ring as the raceway and which limits the raceway without being a part of the raceway.

10 Claims, 1 Drawing Sheet

(56) References Cited

U.S. PATENT DOCUMENTS

2016/0169282 A1* 6/2016 Manne .................... F16C 43/04
 384/477
2018/0298944 A1* 10/2018 Efraimsson ........... F16C 33/586

FOREIGN PATENT DOCUMENTS

| KR | 20100038916 A | * | 4/2010 | ............ F16C 33/585 |
| RU | 2133893 C1 | * | 7/1999 | ............ F16C 33/585 |
| SU | 593017 A1 | * | 2/1978 | ............. F16C 23/08 |

* cited by examiner

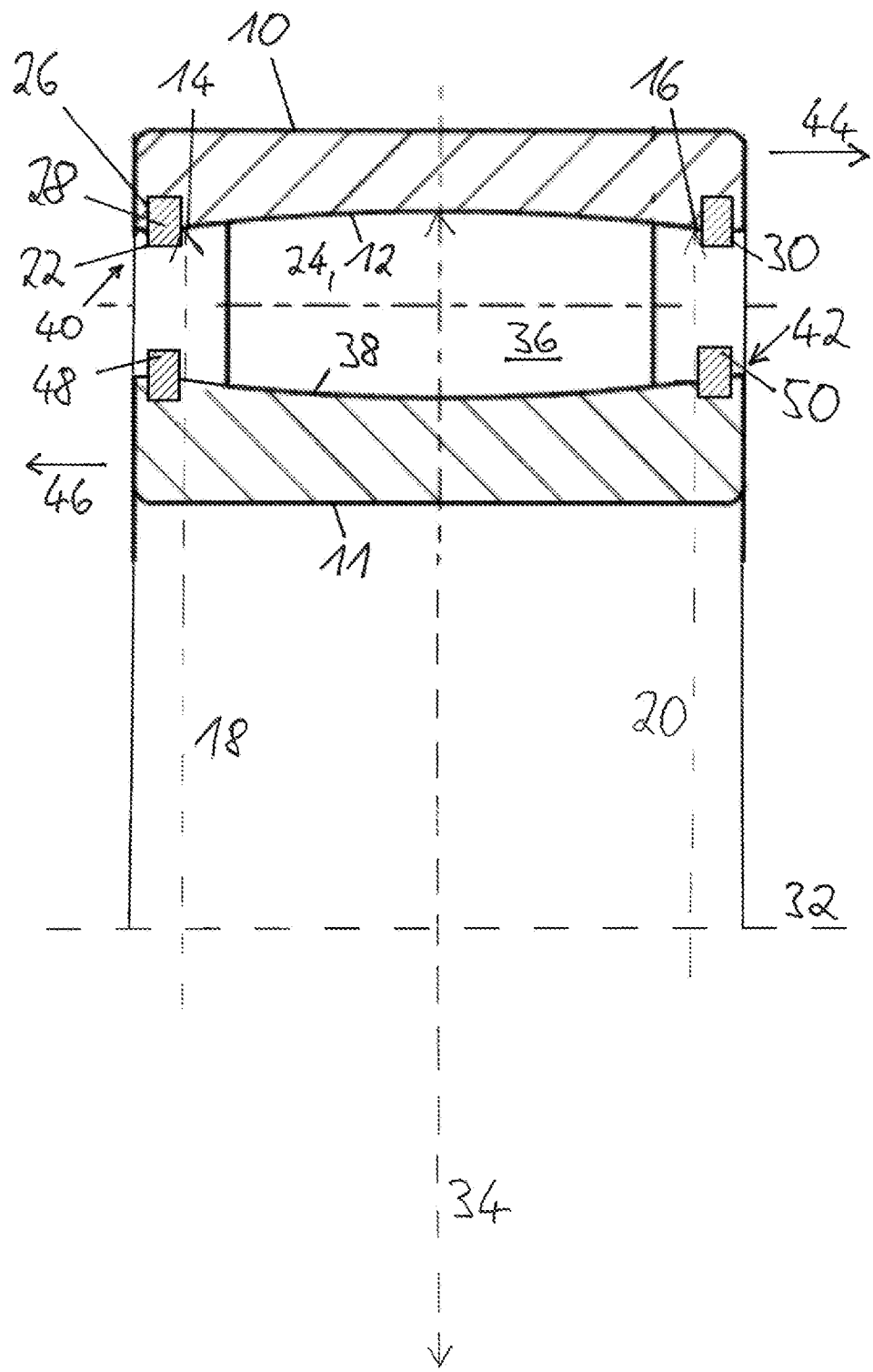

ROLLER BEARING RING AND DISMOUNTING PROCEDURE

CROSS-REFERENCE TO RELATED APPLICATIONS

This application claims priority to German Patent Application no. 102020200361.0, filed Jan. 14, 2020, the contents of which is fully incorporated herein by reference.

TECHNICAL FILED OF THE INVENTION

The invention relates to a roller bearing ring with at least one raceway. In particular, the invention relates to a roller bearing ring with at least one raceway and the roller bearing ring includes a projection, which is on the same side of the bearing ring as the raceway.

BACKGROUND OF THE INVENTION

A roller bearing ring is known which comprises a raceway of an outer ring which is a part of a sphere. A roller bearing, which can comprise the roller bearing ring, is known as a toroidal roller bearing (e.g. CARBO). Such bearings can be mounted between a shaft and a housing and can be dismounted with certain tools.

SUMMARY OF THE INVENTION

The task of the invention is in particular to provide a generic roller bearing ring which supports an easy dismounting of the roller bearing, which comprises the roller bearing ring.

The invention starts from a roller bearing ring with at least one raceway, wherein the raceway comprises a first and a second axial end and a diameter of the first axial end and a diameter of the second axial end are either both bigger than the mean diameter of the raceway or both smaller than the mean diameter of the raceway.

It is suggested that the roller bearing ring comprises a projection, which is on the same side of the bearing ring as the raceway and which limits the raceway without being a part of the raceway. The mean diameter of the raceway is defined as $$\frac{\int_a^b D(x)dx}{(b-a)},$$

wherein the integration is performed along the rotational axis of the bearing ring and a and b are the coordinates of the start point and the end point of the raceway and D(x) is the diameter of the raceway as a function of the coordinate x which is measured along the rotational axis. The raceway is rotationally symmetric with respect to the rotational axis. According to this a support of an easy dismounting of a roller bearing, which comprises the roller bearing ring, is achieved.

In particular it can be accomplished that a dismounting force is transferred from the roller bearing ring to a roller element of the roller bearing via the projection, which helps to prevent self-locking during a mounting procedure. Self-locking means that the bearing is getting stuck for example between a shaft and a housing during a dismounting procedure because of a decrease in its minimal diameter and an increase in its maximum diameter because of the relative axial motion between the outer and inner ring.

Preferably the roller bearing ring comprises on the side, on which the raceway is located, a groove next to the raceway. Through this an easy fixation of the projection can be accomplished.

Advantageously the roller bearing ring comprises a construction element, which is partly located inside the groove and which at least partially forms the projection. Thereby a cost-effective construction can be achieved.

Furthermore, it is suggested that the construction element is a circlip. Through this an easy mounting procedure can be accomplished.

Preferably the roller bearing ring comprises on the side, on which the raceway is located, a further projection so that the raceway is located between the projections. By this the roller bearing ring supports an easy dismounting of the roller bearing in both axial directions.

Advantageously the part of the raceway, which is contained in an axial section through the roller bearing ring, has the form of a circular arc. Thereby the roller bearing ring can be part of the roller bearing which can accommodate misalignment and heavy radial loads, but is also able to take axial displacement like a cylindrical roller bearing. Preferentially the radius of the circular arc is bigger than a maximal distance of a point of the circular arc to a rotational axis of the roller bearing ring, which provides the possibility that the bearing ring is part of a toroidal roller bearing. Preferably the roller bearing ring is an outer ring or an inner ring. In both cases easy dismounting of the complete roller bearing can be supported.

Moreover, a roller bearing with an outer ring, which is constructed according to the preceding description, and with an inner ring, which is also constructed according to the preceding description, is suggested wherein roller elements of the roller bearing contact the raceway of the inner ring and the raceway of the outer ring. If the outer ring comprises the projection on an axial side which is opposed to an axial side on which the inner ring comprises its projection, an axial displacement of the outer ring relative to the inner ring can be limited, because in the case, in which the projection of the outer ring contacts one face side of the roller element and the projection of the inner ring contacts the other face side of the roller element further axial displacement of the outer ring relative to the inner ring is prohibited.

Furthermore, a procedure for dismounting a roller bearing, in particular a roller bearing as precedingly described, is suggested, wherein a first force is applied to the outer ring and a second force is applied to the inner ring, wherein the first and the second force are opposed to each other and at least one of the rolling elements of the roller bearing contacts a projection of the outer ring, which is adjacent to the raceway of the outer ring, and wherein the at least one rolling element contacts a projection of the inner ring, which is adjacent to the raceway of the inner ring.

Thereby an easy dismounting can be achieved. In particular the relative axial displacement of the inner and the outer ring can be limited, which limits the growth of the maximal outer diameter and the simultaneous decrease of the minimum inner diameter of the roller bearing to an extent, at which self-locking between the shaft and a housing does not occur. Preferably the axial position of each projection is such that the roller can contact both projections before the bearing clearance is consumed. In particular the dismounting is fast and easy and does not depend on specially trained staff and/or special dismounting tools.

Further advantages result from the following drawing description.

BRIEF DESCRIPTION OF THE DRAWINGS

The drawing shows an example of the invention. The drawing, the description and the claims contain numerous features in combination. The person skilled in the art will also consider the features individually and summarize them to meaningful further combinations.

FIG. 1 shows an axial section through an upper half of a roller bearing according to the invention.

DETAILED DESCRIPTION OF THE INVENTION

FIG. 1 shows an axial section through an upper half of a roller bearing. The roller bearing comprises a roller bearing ring 10 according to the invention which comprises a raceway 12 with the first and the second axial end 14, 16. The roller bearing ring 10 is an outer ring. Furthermore, the roller bearing comprises a second roller bearing ring 11 which is an inner ring of the roller bearing and which is also constructed according to the invention. Diameter 18 of the first axial end 14 and diameter 20 of the second axial end 16 are both smaller than the mean diameter of the raceway 12. The raceway 12 is located on the radially inner side 24 of the roller bearing ring 10. On the side 24 the roller bearing ring 10 comprises a projection 22 which limits the raceway 12 without being a part of the raceway 12.

The projection 22 is built by a construction element 28 which is partly located inside a groove 26 of the roller bearing ring 10. The groove 26 is situated directly at the axial end 14 of the raceway 12 and extents for 360° in the circumferential direction of the roller bearing ring 10 around a rotational axis 32 of the roller bearing ring 10. The groove 26 is also located on the side 24 of the roller bearing ring. The construction element 28 is a circlip. On the side 24 the roller bearing ring 10 comprises a further projection 30 which is built by a further circlip that is located in a further groove of the roller bearing ring 10.

The further groove is also located on the side 24 and extents also around 360° in the circumferential direction around the rotational axis 32 of the roller bearing ring 10. The further groove and the further projection are directly located at the second axial end 16 of the raceway 12. Therefore the raceway 12 is located between the projection 22 and the projection 30. The roller bearing ring 11 also comprises a first projection 48 and a second projection 50. They are also located directly at axial ends of the raceway 38 of the roller bearing ring 11, wherein the raceway 38 is axially located between these projections 48, 50. Moreover, the projections 48, 50 are also built by circlips which are located in grooves of the roller bearing ring 11, the grooves extend around 360° in circumferential direction about the rotational axis 32.

Furthermore, the part of the raceway, which is contained in an axial section through the roller bearing ring 10, has the form of a circular arc. The radius 34 of this circular arc is bigger than a maximal distance of the point of the circular arc to the rotational axis 32 of the roller bearing ring 10. The raceway 38 is in the axial section also a circular arc. Moreover, in the axial section a roller element 36 is located between the roller bearing rings 10, 11 and contacting them via the raceways directly. In the axial section the raceway of the roller element consists of two circular arcs, wherein the radii of the last mentioned circular arcs are smaller than the radii of the circular arcs of the raceways of the bearing rings. Because of the described geometry the roller bearing is known as toroidal roller bearing.

In a situation in which the roller bearing is mounted the roller bearing ring 11 can be press fitted on a shaft and the roller bearing ring 10 can be press fitted in a bore for fastening. In such a configuration the described projections of the roller bearings are advantageous for dismounting the roller bearing. In order to dismount the roller bearing a force 44 is applied to the outer ring which pulls the outer ring axially along the rotational axis 32 until the projection 22 contacts the roller element 36 directly and the roller element contacts the projection 50 directly. When this happens the force is transferred to the roller bearing ring 11 and consequently the roller bearing ring 11 is moved relatively to the shaft axis direction, wherein due to friction with the shaft a second force 46 is exerted on the roller bearing ring 11 and the second force 46 is directed in an opposite direction as the force 44.

Because the projections 22, 50 limit the relative axial motion of the roller bearing rings 10, 11, the increase of the maximum diameter of the outer ring is limited and also the decrease of a minimum diameter of the inner ring is limited to an extent to which clamping forces coming from the housing and the shaft do not stop or prohibit the axial motion of the roller bearing which is necessary for the dismounting procedure. Self-locking cannot occur.

For dismounting the roller bearing it is in principle enough that the roller bearing comprises only two of the four projections 22, 30, 48, 50. Of course if the roller bearing only comprises two projections they have to be on opposite axial sides and one has to be part of the outer ring and the other one has to be part of the inner ring. However, it is more advantageous that the roller bearing comprises all four projections 22, 30, 48, 50, because then it is not possible that the roller bearing is mounted in a wrong way that makes a dismounting procedure in a certain axial direction supported by two projections as described above impossible.

A similar situation is when dismounting a toroidal roller bearing with its housing from the shaft of a continuous caster roll line. In this case toroidal roller bearings have usually loose fit both with housing and shaft for fast and easy dismounting. However, due to the environment in a continuous casting machine the shaft surface sometimes becomes very corroded. In this case the invention can facilitate dismounting with conventional tools and methods.

In conventional toroidal roller bearings, which are not according to the invention there are no inner ring projections. There can be one or two outer ring projections, but these are not designed to be contacted by the rollers when mounted. Therefore they are positioned away from the raceway and do not limit the raceway.

Hence the outer and inner ring can move relative to each other axially to a big extent. As already mentioned in such a situation during dismounting self-locking can happen. Then an application of a bigger force will only lead to a condition in which the bearing is more stock, which means that methods to destroy the bearing might be needed for dismounting. With the invention all of this cannot occur and the bearing can be dismounted easily and even can be reused.

The invention claimed is:

1. A roller bearing, comprising:
    an outer ring, comprising:
        at least one outer raceway comprising a first axial end having a first axial end diameter and a second axial end having a second axial end diameter, the first and the second axial end diameters being both less than a mean diameter of the at least one outer raceway relative to the axis of rotation, and a first projection being located on a same side of the outer ring as the at least one outer raceway and which axially limits the outer raceway without forming part of the outer raceway, an inner ring, comprising:

at least one inner raceway comprising a third axial end having a third axial end diameter and a fourth axial end having a fourth axial end diameter, the third and the fourth axial end diameters being both greater than a mean diameter of the at least one inner raceway, and a second projection being located on a same side of the inner ring as the at least one inner raceway and which axially limits the inner raceway without forming part of the inner raceway, and wherein roller elements of the roller bearing contact the inner raceway and the outer raceway, and wherein the first projection and the second projection are on axially opposite axial sides of the bearing.

2. The roller bearing according to claim 1, further comprises on the side, on which the raceway is located, a groove next to the raceway.

3. The roller bearing according to claim 2, wherein the roller bearing ring comprises a construction element, which is partly located inside the groove and which at least partially forms the projection.

4. The roller bearing according to claim 3, wherein the construction element is a circlip.

5. The roller bearing according to claim 1, further comprises on the side, on which the raceway is located, a further projection so that the raceway is located between the projections.

6. The roller bearing according to any of the preceding claims, wherein the part of the raceway, which is contained in an axial section through the roller bearing ring, has the form of a circular arc.

7. The roller bearing according to claim 6, wherein the radius of the circular arc is greater than a maximal distance of a point of the circular arc to a rotational axis of the roller bearing ring.

8. A procedure for dismounting a roller bearing, in particular a roller bearing comprising:

providing roller bearing ring having at least one raceway, wherein the raceway comprises a first axial end and a second axial end and a diameter of the first axial end and a diameter of the second axial end are either both greater than the mean diameter of the raceway or both less than the mean diameter of the raceway, and wherein the roller bearing ring comprises a projection, which is on the same side of the bearing ring as the raceway and which limits the raceway without being a part of the raceway, wherein the roller bearing ring is an outer ring or an inner ring, wherein roller elements of the roller bearing contact the raceway of the inner ring and the raceway of the outer ring, wherein a first force is applied to the outer ring and a second force is applied to the inner ring, wherein the first force and the second force are opposed to each other and at least one of the rolling elements of the roller bearing contacts a projection of the outer ring, which is adjacent to the raceway of the outer ring, and wherein the at least one rolling element contacts a projection of the inner ring, which is adjacent of the raceway of the inner ring.

9. The procedure of claim 8, wherein the step of providing the roller bearing ring further comprises the diameter of the first axial end and the diameter of the second axial end are both greater than the mean diameter of the raceway.

10. The procedure of claim 8, wherein the step of providing the roller bearing ring further comprises the diameter of the first axial end and the diameter of the second axial end are both less than the mean diameter of the raceway.

* * * * *